July 25, 1967     C. D. WILLIAMS     3,333,086

TEMPERATURE CONTROL APPARATUS AND METHOD

Filed Oct. 5, 1961

INVENTOR.
CARL DE-VOY WILLIAMS
BY
Mead, Browne, Schuyler & Beveridge
ATTORNEYS

United States Patent Office 3,333,086
Patented July 25, 1967

3,333,086
TEMPERATURE CONTROL APPARATUS
AND METHOD
Carl D. Williams, Pasadena, Calif., assignor to Robertshaw Controls Company, Richmond, Va., a corporation of Delaware
Filed Oct. 5, 1961, Ser. No. 143,145
14 Claims. (Cl. 219—501)

This invention relates to the precision control of temperatures, making use of proportional heating governed by change of state conditions in a fusible material at its melting point to control conductivity in semiconductor device circuits. More particularly, it relates to the control of an enclosed space temperature by the combined heating of a load element in a transistor circuit and the heat dissipated internally within a transistor of the power-handling type, operating at high gain through a thermal negative feedback. It is especially useful for precision temperature stabilization of frequency controlling elements such as crystals.

Considerable prior effort has been directed to the accurate control of temperature in an enclosure suitable for the housing of small electrical components because of their sensitivity to temperature. Small ovens have been designed having various means for precision control of the temperature therein, employing temperature sensitive devices whose electrical output is employed for the control of a vacuum tube circuit, or electromechanical means for governing the heat input to such an apparatus in accordance with the temperature at the sensing element. Most such devices have employed an on-off switch governed in accordance with whether the sensed temperature exceeds a predetermined limit. Other devices have been directed to proportional control of a heating current varying inversely with the temperature determined to exist within the region under consideration. Most such controls have been intricate, cumbersome and expensive to manufacture, or have had insufficient sensitivity to temperature change. In other cases where on-off contacts have been used, mechanical troubles have developed and the regulating mechanisms have ultimately failed to function properly.

It is, accordingly, an object of this invention to provide a chamber of precisely regulated temperature without contacts in the heating circuit.

Another object is to provide an improved regulating mechanism for the control of temperature in a space employing high gain error signal amplification to minimize temperature changes.

Another object of the invention is to provide fusible mass temperature reference signals combined with electrical amplification for the precise control of the operating temperature for electrical apparatus.

A further object of the invention is to utilize a heretofore undesirable characteristic of a transistor for the control of an operating temperature.

Still other objects and advantages of the invention will be apparent to those skilled in the art as the invention is described in connection with the following drawings in which.

Figure 1:
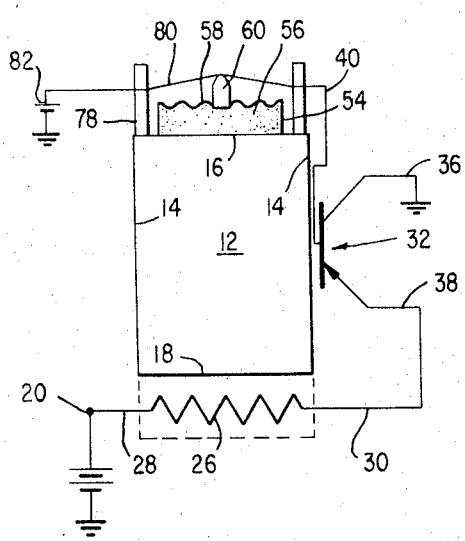
FIG. 1 is a schematic diagram of a temperature control system according to this invention.

Referring now to FIG. 1 for one mode of applying the invention to temperature stabilization of an object, there is indicated generally at 12, an enclosed space, oven or other object having lateral walls 14, upper wall 16 and floor 18, to be held at a precise temperature between atmospheric or ambient temperature and the maximum permissible operating temperature of a selected power transistor device. The choice of temperature will depend upon the availability of a suitable temperature reference point, and the choice of transistor device used for this purpose, which governs the upper temperature at which this object may be controlled. For example, employment of a germanium-type power transistor generally limits the junction temperatures therein to 85° C. or less, whereas the employment of a silicon transistor device permits elevating the temperature to a much higher value, such as 150° C. Choice of grounded emitter, grounded collector or other arrangement is optional, grounded collector being illustrated in FIG. 1.

The object or enclosure may be heated electrically, as for example, by an electrical resistance element 26 surrounding or underlying at least a portion of the enclosure. This element is supplied with leads at 28 and 30 to which there is connected at terminal 20 a power supply, illustratively indicated as a battery, to provide a heating current. The arrangement of the heating element is conventional and may be of any convenient type, for example, a resistance unit underlying the base or floor 18 of the enclosure or a resistance element around or within the walls 14.

Figure 2:
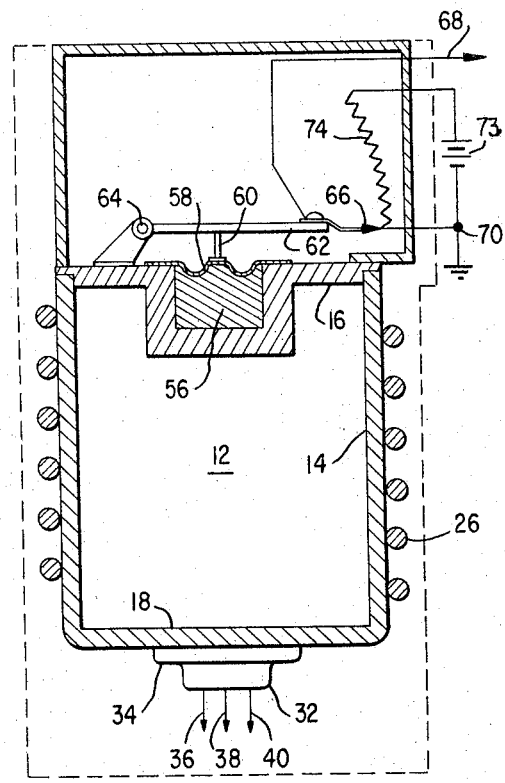
FIG. 2 is a sectional view partly schematic of the system of FIG. 1 applied to oven temperature control.
Figure 3:
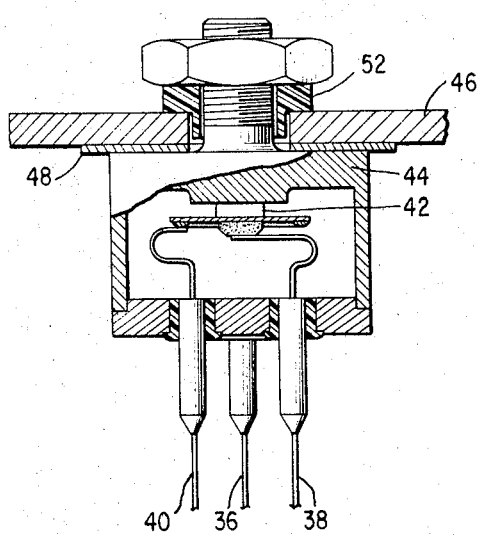
FIG. 3 is a detailed sectional representation of a heat transfer arrangement between a power transistor and a heat sink body such as the wall of the oven of FIG. 2.

The present invention adjusts the magnitude of current employed for heating, rather than the duration of the heating current, by use of a semiconductor device of the transistor type and particularly one referred to as a power transistor. Such a transistor 32 is shown in FIG. 2 in one of its conventional forms attached to wall or floor 18 of an enclosure and in thermal contact therewith whereby base flange 34 thereof is in intimate thermal contact with the wall of the enclosure. For this purpose the wall structure is preferably of metallic construction and a good thermal conductivity, being of substantial thickness such that the temperature of the flange 34 is imparted to the interior of the enclosure across at least one wall thereof. The unit 12 may also be insulatingly packed within a vacuum bottle, or the like, so that the temperature of the interior of the enclosure is closely dependent upon the temperature of the body of the transistor element. Such transistors are of a number of form each comprising at least a collector element, an emitter element and a base element. Leads thereto are designated as 36, 38 and 40, respectively. In transistors of the power type now commercially available, as in FIG. 3, it is customary to provide a heat sink for extracting heat developed within the transistor in order that the temperature therein may not exceed a permissible limit corresponding to thermal instability or "run-away." For this purpose good thermal contact is made within the transistor between the collector terminal 42 and a massive heat conductor 44 and/or base flange 34, thereby to provide a heat sink, e.g., plate 46 to carry heat developed therein via element 44 and/or flange 34 to a suitable cooling area. By this arrangement the heat sink for the power transistor becomes the heater for the chamber supplemented usually by heater 26 forming the load in pedance of the transistor circuit. This employs the usually undesirable heating effect in a transistor for a useful purpose, and causes the transistor to govern its own junction temperature so as to avoid thermal instability in operation of the transistor. Thermal stability is discussed in detail in "Transistor Electronics" by Dewitt and Rossoff, McGraw-Hill, 1957 at page 169 et seq. where the heat to be dissipated is considered as largely due to the collector current $I_c$.

A high current power transistor may suffice for heating an object or stabilizing the temperature of a spa through the heat dissipation from the junction, but is preferably supplemented at least during warm-up by that generated in a transistor load impedance in the form of a heating coil 26 placed in controlling relation to temperature in the chamber. The load impedance serves to limit current in the transistor and may be used to assist in maintaining thermal stability. The heat so developed is imparted to the chamber, and by way of a suitable sensing element and electrical conversion therefor, a negative signal is generated and fed back to lower the current causing both the junction temperature rise and the coil heating.

While the collector junction may be directly grounded, and thermally cooled by contact with a heat sink, other mechanical arrangements may serve as well. The configuration of FIG. 3 may be employed, wherein element 14 conducts thermally and electrically from collector 42 and is electrically insulated from plate 46 by mica washer 48, but is in good thermal conducting relation therewith.

Likewise, the transistor may be either of the P-N-P type or the N-P-N type when the polarity of a direct current voltage applied thereacross is changed according to well known transistor requirements.

As illustrated, the resistance element 26 is connected in series with the emitter-collector internal circuit of the transistor, and a source of electrical energy is connected hereto at terminal 20. In transistor devices the external resistance connected between the emitter and collector may be large in order to increase the overall efficiency of the device and may have a value comparable to that of the internal resistance between the emitter and the collector. When connected in the grounded collector configuration, for example, a low wattage heater may have a resistance of the order of 125 ohms and supply an output in the order of 5 to 10 watts with a power amplification of about 15 db. The heat developed internally within transistor 32 is added to that developed in heater 16 to develop from their combined effects a heat transfer to the chamber which gives rise to a signal to decrease the heating current. The proportion of heat developed externally and internally can be adjusted to vary the proportion of the enclosure heating which is supplied by the transistor junctions.

The choice of internal vs. external resistance is dictated by conventional transistor engineering practices modified to the desired extent to increase or decrease the control factor resulting from direct heating of the controlled structure by the internal transistor heat. If it is undesirable to add large percentages of heating external to the transistor, the heating capacity of the element 26 may be reduced with respect to the internal collector-emitter resistance heating. This relation may be arranged to provide, after initial warm-up, that the junction heating becomes the predominant element. Biasing and feedback resistor arrangements may be employed as illustrated in FIGS. 6–11, 6–15 of "Transistor Electronics," above mentioned, requiring no discussion herein since they do not form a part of the present invention.

Likewise, the employment of an impedance-changing transformer, either in the input circuit for the base control element, or in the output is, of course, an optional feature. It may be noted that the transistor and its external load circuit may be energized either by direct current or by alternating current, and the transistor may have diode rectifiers for bias control in accordance with well known transistor principles.

The oven 12 may be manufactured as illustrated in FIG. 2, or in a variety of other forms, suitable for exterior insulation, being designated to have enclosed therein any component for which the temperature must be held constant.

A preferred form of current control dependent upon the heat imparted to the enclosure is illustrated in FIG. 1, wherein element 54 is a form of a fusible salt or alloy cartridge designed to have a relatively large expansion and heat absorption during fusion before a change of temperature can occur therein. Expansion of the cartridge operates to vary the output, for example, of a strain gauge designed to produce a voltage or current output varying with the heat content of the capsule during fusion at a fixed reference temperature. The encapsuled material 56 may be any salt or selected alloy having a suitable fixed melting temperature. It may be cast into a separable cartridge, as at 54, or into a well in cover 16, as in FIG. 2, being enclosed by a flexible cover on one side, as at 58. Pin 60, suitably insulated, may operate lever 62 pivoted at 64 to actuate rheostat arm 66, having signal output at 68 derived from a grounding at 70 and source of potential 72 connected across impedance 74. Alternatively a strain gauge may supply a signal of decreasing magnitude as the temperature rise in chamber wall 16 exceeds the fixed temperature sufficiently to produce partial melting of material 56. A wire type strain gauge may be employed, wherein support 78 surrounds cartridge 54 and has strain member 80 actuated by movement of pin 60 of the salt cartridge. Output may be taken from one end of element 80, as at 40, being supplied with a potential from source 82 varied by pressure from pin 60.

Capsule 54 expands upon heating at the fusion temperature as long as any solid material remains. During expansion, pin 60 is displaced to actuate element 80 or 62, and the signal input to transistor 32 is varied over its full operating range. The heater coil 26 serves to limit the current in the transistor during initial warm-up, and thereafter the operating range is within the region of partial liquid phase of the material 56, which is thus held at its fusion temperature for a considerable range of displacement of pin 60. Since a high degree of amplification, both mechanical and electrical, is realizable between the heat sensing signal and the resultant heating current, the temperature control may be made as precise as required for the application at hand, provided the device is shielded or insulated from effects of rapid changes of ambient temperature. The material 56 is in good thermal contact with the wall 16 and may occupy the entire wall through which the body 12 is cooled, to assure that heat ballasting by the heat of fusion is utilized prior to effective temperature changes within the walls.

While the invention has been described in connection with an oven, a fusible salt or alloy heat-sensing device, it will be understood that the control of temperature by heat generated within the transistor output junction may be otherwise practiced without departing from the scope of the invention set forth in the following claims.

What I claim is:

1. A temperature control system comprising an object temperature sensing means expansible upon change of temperature, continuously variable resistance cell means actuated by said temperature expansible means, means deriving a varying electrical signal from said cell means, transistor power amplifying means energized and connected for response to said signal means thereby to pass an amplified power output, a transistor load circuit connected to receive said output, heat transfer means substantially conveying the heat generated in said transistor means and said load circuit to said object the temperature of which is sensed.

2. Constant temperature apparatus comprising; a walled enclosure having conductive walls to equalize temperature therearound, an electric heater element adjacent a wall of said enclosure; a current supply circuit from an electric power source to said element, transistor means thermally communicating with said wall and connected as a linear control for said circuit, having base, collector and emitter elements of which a said collector and a said emitter are in said circuit; means producing a control signal varying with the heat communicated at a fixed temperature to said enclosure; and means applying said signal to said base element to linearly control conductivity thereof inversely with said communicated heat at a said fixed temperature.

3. In the apparatus of claim 2 said signal producing means including fusible material in thermal communication with said heater arranged to generate a decreasing signal in accordance with the degree of usion of said material.

4. The apparatus of claim 2, said signal producing means comprising a strain gauge actuated by a salt stable element thermally responsive to the heating of said enclosure.

5. The apparatus of claim 4, said salt stable element being a fusible material enclosed to expand continuously during fusion thereof and arranged for linear actuation in accordance with expansion thereof.

6. A constant temperature oven comprising, an electrical heater adjacent the oven, a current source energizingly connected to the heater, transistor current control means in series with the heater, change of state means responsive to varying oven heat at a fixed temperature producing a proportionally varying controlling signal in control of said transistor means, and mounting means holding said transistor means in external thermal contact for transferring to said oven the heat generated in the transistor means by heater current therethrough, said oven forming a stabilizing element for said transistor means in combination with said change of state device.

7. An oven according to claim 6 wherein said mounting means includes a metallic heat conductor element between the collector junction of said transistor means and the interior of the oven.

8. An oven according to claim 6 wherein said mounting means includes a metallic heat conductor element between the emitter junction of said transistor means and the interior of the oven.

9. An oven according to claim 6 wherein said heater is energized by the current in the collector-emitter circuit of said transistor means and said control signal is applied to the base thereof.

10. Temperature control apparatus for an enclosed space comprising, a change of state heat content sensing means for said space operative at a fixed temperature, means developing a signal varying with said heat content, an electric heating element including a transistor contiguous to said space, current supply means for said element, continuously variable current control means for said element to provide an internal impedance governed by said signal, and means transferring internal heat of said transistor to said sensing means in control of temperature of said space and said contiguous transistor.

11. A semiconductor heater comprising, base, collector and emitter elements, an electrical current supply connected across said collector and emitter elements, a thermally conducting body in heat transferring contact with at least one of said current elements including means absorbing heat at a fixed temperature, sensing means responsive to changes in the absolute heat content of said body at said temperature, electrical signal forming means actuated by said sensing means, means applying said signal in a biasing sense to proportionally decrease current from said supply as said heat content increases without substantial change of temperature.

12. The method of regulating the temperature in a confined space comprising, deriving an electrical signal inversely indicative of heat content of said confined space substantially independently of temperature variations and at a fixed temperature therein, amplifying said signal, applying said amplified signal for variably generating heat in inverse relation to variations of heat content of said fixed temperature, and transferring said generated heat to said space under control of said signal.

13. A method of temperature control for a body comprising, sensing variations in the heat content of said body at a reference temperature substantially independently of temperature variations and registering variation in said heat content as an electrical signal, amplifying said signal, applying the amplified signal to directly control the impedance of a resistance element in an energized electrical circuit, and applying the heat developed in said circuit to increase the heat content of said body without substantial change in the temperature thereof.

14. A temperature control device for a space comprising, an electrical power source, a heater adjacent said space energized from the power source, an amplifying semiconductor device in series with the heater, a signal generating element responsive to changes in heat imparted to said space, means including a thermally conducting structure transferring heat generated in the semiconductor device to said space, and a current control element in the semiconductor device connected responsively to said signal element to vary said semiconductor current in amplified inverse proportion of said changes, said signal generating element being a fused salt element expansible upon absorption of heat therein during change of state of the salt.

References Cited
UNITED STATES PATENTS

| | | | |
|---|---|---|---|
| 1,332,182 | 2/1920 | Leeds | 236—70 |
| 1,763,666 | 6/1930 | Machlet | 236—82 |
| 1,859,765 | 5/1932 | Burleigh. | |
| 1,994,771 | 3/1935 | Knopp. | |
| 2,524,886 | 10/1950 | Colander et al. | 219—210 |
| 2,846,592 | 8/1958 | Rutz | 250—211.1 |
| 2,870,310 | 1/1959 | Van Overbeek | 219—10.77 |
| 2,932,714 | 4/1960 | Merrill | 219—501 |
| 2,938,130 | 5/1960 | Noll | 219—501 |
| 3,028,473 | 4/1962 | Dyer et al. | 219—501 |
| 3,079,484 | 2/1963 | Shockley et al. | 219—501 |
| 3,229,071 | 1/1966 | Wisz | 219—501 |
| 3,300,623 | 1/1967 | Smyrnos | 219—501 |

OTHER REFERENCES

Sutcliffe: Transistor Temperature Controller; Electronics, Mar. 28, 1958; (pp. 81, 82, 84).

RICHARD M. WOOD, *Primary Examiner.*

L. H. BENDER, *Assistant Examiner.*